(12) United States Patent
Garcia Martin et al.

(10) Patent No.: US 10,200,943 B2
(45) Date of Patent: Feb. 5, 2019

(54) ACCESS NETWORK, SELECTION AND CONNECTION METHODS, DEVICES, AND COMPUTER PROGRAMS

(71) Applicant: Telefonaktiebolaget L M Ericsson (publ), Stockholm (SE)

(72) Inventors: Miguel Angel Garcia Martin, Pozuelo de Alarcon (ES); Pablo Martinez De La Cruz, Madrid (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 63 days.

(21) Appl. No.: 14/907,476

(22) PCT Filed: Jul. 29, 2013

(86) PCT No.: PCT/EP2013/065892
§ 371 (c)(1),
(2) Date: Jan. 25, 2016

(87) PCT Pub. No.: WO2015/014383
PCT Pub. Date: Feb. 5, 2015

(65) Prior Publication Data
US 2016/0183180 A1    Jun. 23, 2016

(51) Int. Cl.
*H04W 48/18* (2009.01)
*H04W 76/10* (2018.01)
(Continued)

(52) U.S. Cl.
CPC .......... *H04W 48/18* (2013.01); *G06K 7/1413* (2013.01); *H04B 5/0031* (2013.01); *H04W 48/16* (2013.01); *H04W 76/10* (2018.02)

(58) Field of Classification Search
CPC ..... H04W 48/18; H04W 76/10; H04W 48/16; G06K 7/1413; H04B 5/0031
See application file for complete search history.

(56) References Cited

U.S. PATENT DOCUMENTS

2007/0197237 A1* 8/2007 Powell .................... H04L 63/18
                                                                  455/466
2010/0260174 A1* 10/2010 Preiss .................... H04L 45/42
                                                                  370/389
(Continued)

FOREIGN PATENT DOCUMENTS

EP    2 413 630 A1    2/2012
KR    10-1787919 B1   10/2017
(Continued)

OTHER PUBLICATIONS

PCT Notification of Transmittal of the Interantional Search Report and the Written Opinion of the International Searching Autahority, or the Declaration for International application No. PCT/EP2013/065892, dated May 13, 2014.
(Continued)

*Primary Examiner* — Brandon M Renner
*Assistant Examiner* — Jay L Vogel
(74) *Attorney, Agent, or Firm* — Baker Botts, LLP

(57) ABSTRACT

In a telecommunication network, a method is carried out for assisting a user terminal (100) in connecting to an access network. The user terminal (100) obtains (s20) information (50), i.e. "tag information", from an electronic tag or a visual tag. The user terminal (100) transmits (s40), to a network node hosting an access network discovery and selection function (ANDSF), i.e. to an "ANDSF node" (200), the tag information (50). The ANDSF node (200) then transmits (s60), to the user terminal (100), credentials (70) for allowing the user terminal (100) to connect to said access network. The invention also relates to methods carried out by a user terminal (100), to methods carried out by an ANDSF node (200), to user terminals (100), to ANDSF nodes (200), to computer programs, and to computer program products (Continued)

for assisting user terminals (100) in connecting to an access network.

25 Claims, 9 Drawing Sheets

(51) Int. Cl.
    *H04W 48/16*          (2009.01)
    *G06K 7/14*            (2006.01)
    *H04B 5/00*            (2006.01)

(56) References Cited

U.S. PATENT DOCUMENTS

| | | | |
|---|---|---|---|
| 2012/0196644 A1* | 8/2012 | Scherzer | H04W 72/02 455/524 |
| 2013/0282903 A1* | 10/2013 | DeLuca | H04W 12/04 709/225 |
| 2014/0040504 A1* | 2/2014 | Gupta | H04W 24/04 709/244 |
| 2014/0118113 A1* | 5/2014 | Kaushik | H04W 12/12 340/8.1 |
| 2014/0161026 A1* | 6/2014 | Stojanovski | H04L 45/22 370/328 |
| 2014/0282960 A1* | 9/2014 | Tinnakornsrisuphap | H04L 63/083 726/7 |
| 2015/0296440 A1* | 10/2015 | Forssell | H04W 48/08 370/329 |

FOREIGN PATENT DOCUMENTS

| | | |
|---|---|---|
| WO | WO 2013/029672 A1 | 3/2013 |
| WO | WO 2015 014383 A1 | 2/2015 |

OTHER PUBLICATIONS

3GPP TS 24.312 v12.1.0; Technical Specification; 3rd Generation Partnership Project; Technical Specification Group Core Network and Terminals; Access Network Discovery and Selection Function (ANDSF) Management Object (MO) (Release 12), Jun. 2013.

3GPP TR 24.801 v8.0.1; Technical Report; 3rd Generation Partnership Project; Technical Specification Group Core Network and Terminals; 3GPP System Architecture Evolution; CT WG1 Aspects (Release 8), Oct. 2008.

3GPP TS 23.402 v12.1.0; Technical Specification; 3rd Generation Partnership Project; Technical Specification Gorup Services and System Aspects; Architecture enhancements for non-3GPP accesses (Release 12), Jun. 2013.

Notice of Preliminary Rejection issued by the Korean Intellectual Property Office (KIPO) for Korean Patent Application No. 2016-7002220 of International Application No. PCT/EP2013/065892 (English translation attached)—dated Dec. 21, 2016.

Office Action issued by the Mexican Patent Office for MX/a/2015/017217—dated Dec. 4, 2017.

* cited by examiner

ACCESS NETWORK, SELECTION AND CONNECTION METHODS, DEVICES, AND COMPUTER PROGRAMS

PRIORITY

This nonprovisional application is a U.S. National Stage Filing under 35 U.S.C. § 371 of International Patent Application Serial No. PCT/EP2013/065892, filed Jul. 29, 2013, and entitled "Access Network Selection And Connection Methods, Devices, And Computer Programs."

TECHNICAL FIELD

The present invention relates to methods for assisting a user terminal in selecting an access network and connecting thereto. The invention also relates to devices for participating in such methods, and to computer programs therefor.

BACKGROUND

The deployment of radio access network technologies in parallel to cellular networks, combined with the widespread use of multimode mobile communication devices, has created the opportunity to offload mobile communications to, for example, wireless access networks (such as: wireless local area networks—also known as "Wi-Fi" networks—and wireless metropolitan area networks—also known as "WiMax" networks) in order to alleviate congestion in cellular networks. These offloading techniques also enable telecommunication operators to increase their capacity and data coverage. Many wireless LANs have been deployed in airports, train stations, restaurants, hotels, libraries, campuses, etc., and their number is growing. At the same time, the data traffic going through mobile communication networks is growing as well. Efforts have been made to standardize, at least to a certain extent, cellular and wireless LANs interworking procedures, such as for example the procedures for initiating the offloading of a communication.

In that context, entities hosting an access network discovery and selection function (ANDSF) are used to provide user terminals with rules to discover and select access networks, to prioritize particular access networks and to manage the corresponding connections, so as to efficiently implement the offloading of a communication to a 3GPP or non-3GPP access network.

The ANDSF functionality is notably discussed in (i) 3GPP TS 23.402 V12.0.0 (2013-03), "*Technical Specification; 3rd Generation Partnership Project; Technical Specification Group Services and System Aspects; Architecture enhancements for non-3GPP accesses (Release 12)*", (hereinafter referred to as reference [1]); (ii) 3GPP TS 24.302 V12.0.0 (2013-03), "*Technical Specification; 3rd Generation Partnership Project; Technical Specification Group Core Network and Terminals; Access to the 3GPP Evolved Packet Core (EPC) via non-3GPP access networks; Stage 3 (Release 12)*" (hereinafter referred to as reference [2]); and (iii) 3GPP TS 24.312 V12.0.0 (2013-03); "*Technical Specification; 3rd Generation Partnership Project; Technical Specification Group Core Network and Terminals; Access Network Discovery and Selection Function (ANDSF) Management Object (MO) (Release 12)*" (hereinafter referred to as reference [3]), which provides details of the data that can be managed by the messages exchanged between an ANDSF and a UE. References [1], [2] and [3] are available on the 3GPP web site from the following URLs: http://www.3gpp.org/ftp/Specs/html-info/23402.htm; http://www.3gpp.org/ftp/Specs/html-info/24302.htm; and http://www.3gpp.org/ftp/Specs/html-info/24312.htm respectively.

The ANDSF contains data management and control functions to provide network discovery and selection assistance data to user terminals over the S14 interface (i.e., reference point) as per operators' policy. Two modes of operation are defined over the S14 interface for transferring access network policy information from an ANDSF to a user terminal: a "pull" mode, which allows the user terminal to fetch access network discovery and selection policies from the ANDSF, and a "push" mode, which allows the ANDSF to indicate to one or more user terminals that they should fetch policies from the ANDSF.

It is desirable to enable user terminals to connect in a convenient and secure manner to access networks, to therefore efficiently offload mobile communications to access networks such as for example Wi-Fi or WiMax.

SUMMARY

To meet or at least partially meet the above-mentioned goals, methods, user terminals and network nodes according to the invention are defined in the independent claims. Particular embodiments are defined in the dependent claims.

In one embodiment, a method is carried out in a telecommunication network for assisting a user terminal in connecting to an access network. The method comprises the following steps. The user terminal obtains information, hereinafter referred to as "tag information", from at least one of an electronic tag and a visual tag (in particular, the user terminal may, in one sub-embodiment, read the tag information when approaching the electronic tag and/or the visual tag). The user terminal then transmits the tag information to a network node hosting an ANDSF, said network node being hereinafter referred to as "ANDSF node". After receiving the tag information, the ANDSF node transmits, to the user terminal, credentials for allowing the user terminal to connect to the access network.

This enables a convenient and secure establishment of a connection by a user terminal to an access network. The solution does not require the user to manually enter credentials (such as for example, an SSID, a user name, and/or a password) through the user terminal's user interface, thus reducing the operational burden on users and the risks of errors. The solution also enables the cyphering of the connection to the access network and reduces the risk of man-in-the-middle attack.

In this embodiment, the ANDSF node may also transmit, to the user terminal, policy information indicating that connecting to the access network for which the credentials are transmitted is preferred over other access networks.

In one embodiment, a method is carried out by a user terminal for connecting to an access network. The user terminal obtains information (hereinafter referred to as "tag information") from at least one of an electronic tag and a visual tag (in particular, the user terminal may, in one sub-embodiment, read the tag information when approaching the electronic tag and/or the visual tag). The user terminal sends the tag information to an ANDSF node. Then, the user terminal receives, from the ANDSF node, credentials for allowing the user terminal to connect to the access network.

In this embodiment, the user terminal may also receive, from the ANDSF node, policy information indicating that connecting to the access network for which the credentials are received is preferred over other access networks.

In one embodiment, a method is carried out by an ANDSF node, i.e. a network node hosting an ANDSF, for assisting a user terminal in connecting to an access network. The method comprises the following steps. The ANDSF node receives, from the user terminal, information (hereinafter referred to as "tag information"), obtained (or, in particular, read) by the user terminal from at least one of an electronic tag and a visual tag. The ANDSF node then sends, to the user terminal, credentials for allowing the user terminal to connect to the access network.

In this embodiment, the ANDSF node may also transmit, to the user terminal, policy information indicating that connecting to the access network for which the credentials are transmitted is preferred over other access networks.

The invention also relates, in one embodiment, to a user terminal comprising a so-called obtaining unit, a so-called sending unit, and a so-called receiving unit. The obtaining unit is configured to obtain information (hereinafter referred to as "tag information"), from at least one of an electronic tag and a visual tag. The sending unit is configured to send, to an ANDSF node, said tag information. The receiving unit is configured to receive, from the ANDSF node, credentials for allowing the user terminal to connect to the access network.

The invention further relates, in one embodiment, to a network node hosting an ANDSF, i.e. to a so-called ANDSF node. The ANDSF node comprises a so-called sending unit and a so-called receiving unit. The receiving unit is configured to receive, from a user terminal, information (hereinafter referred to as "tag information") obtained by the user terminal from at least one of an electronic tag and a visual tag. The sending unit is configured to send, to the user terminal, credentials for allowing the user terminal to connect to the access network.

The invention also relates to a system of user terminal(s) and network node(s) as described above, implemented for example using a set of programmed computers or the like.

The invention also relates to computer programs, computer program products and storage mediums comprising computer-readable instructions configured, when executed on network nodes or user terminals, to cause the network nodes or user terminals to participate in a method according to any one of the above-described embodiments, or to implement the functions of a network node or user terminal according to any one of the above-described embodiments.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims. A list of abbreviations and their meaning is provided at the end of the detailed description.

Figure 1:
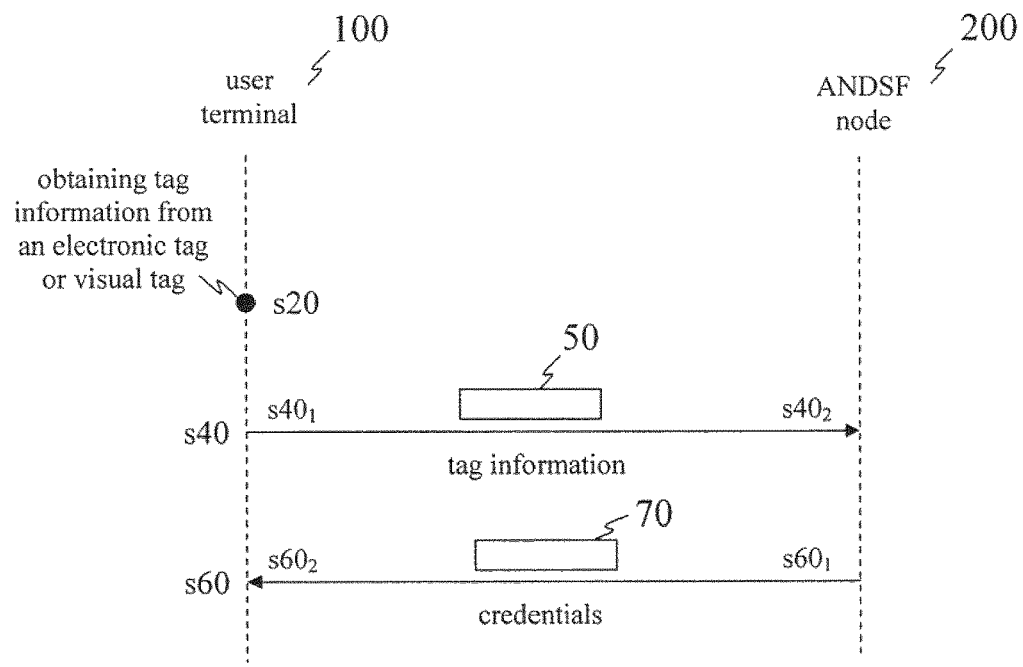
FIG. 1 is a message sequence chart of a method in one embodiment of the invention.

FIG. 1 is a message sequence chart of a method in one embodiment of the invention. The purpose of the method is to assist a user terminal 100 in connecting to an access network. The access network may for example be, but is not limited to, a wireless local area network interoperable with IEEE 802.11 standards, a wireless metropolitan area network interoperable with IEEE 802.16 standards, a personal area network interoperable with Bluetooth standards, a personal area network interoperable with ZigBee standards, or a local area network interoperable with IEEE 802.3 standards (Ethernet). The method may assist user terminal 100 not only in connecting to an access network, but also in selecting to which access network to connect among a plurality of available access networks, and in switching to the selected access network. The aim is to offer end users with the best and/or the most appropriate connection depending for example on their location, the congestion in the available access networks, the bandwidth offered by the access networks, and/or the end user's preference (for example in terms of technical requirements and/or cost considerations).

In step s20, user terminal 100 obtains information 50 (hereinafter referred to as "tag information" 50) from an electronic tag, from a visual tag, or from a combination of both an electronic tag and a visual tag.

The electronic tag may for example comprise, or consist in, a near field communication tag (NFC), a radio-frequency identification (RFID) tag, or a combination thereof. The use of a NFC tag is particularly advantageous since user terminals 100 capable of reading NEC tags (i.e., NFC-enabled user terminals 100) are nowadays widespread. In addition, information can be obtained, i.e. read, from a NEC tag in a convenient and fast manner. The solution merely requires the user to approach his user terminal near the NFC tag. No other user intervention is required.

The visual tag is a tag that is optically readable by a machine and especially by user terminals 100. The tag may for example be readable by means of the user terminal's camera and software or hardware means to extract data from the picture taken by the camera. The visual tag may for example comprise, or consist in, a barcode, which may be, but is not limited to, a linear barcode (also called one dimensional barcode), a two-dimensional barcode (such as for example a matrix barcode) or a combination of both a linear barcode and a two-dimensional barcode. The two-dimensional barcode may for example be a QR code. The use of the QR code is particularly advantageous because the QR code can be read quickly and it has a relatively large storage capacity compared to a one-dimensional barcode. The barcode may however have any geometry.

In step s40, user terminal 100 sends s40$_1$ the tag information 50 to ANDSF node 200, and ANDSF node 200 receives s40$_2$ tag information 50.

The tag information 50 may be transmitted from user terminal 100 to ANDSF node 200 in a message, i.e. a set of bits forming a packet which can be transmitted over a communication network. The tag information 50 may also be transmitted through a series of packets. The tag information 50 may for example be transmitted in an IP packet. The tag information 50 may be transmitted from user terminal 100 to ANDSF node 200 through one or more intermediate network nodes (not illustrated in FIG. 1), such as for example nodes of a cellular access network or packet core network in a mobile or fixed communication network.

Tag information 50 may be transmitted in any suitable format. For example, tag information 50 may be carried in an ANDSF Management Object (MO). Tag information 50 may for example be carried as an information element of the UE_Location node subtree of an ANDSF MO.

Based on the received tag information 50, ANDSF node 200 determines the applicable credentials 70 (not illustrated in FIG. 1). In one embodiment, the step of determining the credentials comprises accessing a database (not illustrated in FIG. 1) storing at least: (a) entries identifying tag information; and (b) for each tag information, credentials 70 to access an access network (or information based on which credentials 70 can be generated, derived or otherwise obtained). Said database may for example be an internal database, i.e. a database hosted on ANDSF node 200, or an external database, i.e. a database accessible by ANDSF node 200. In other words, ANDSF node 200 is capable of being provisioned with data pertaining to electronic and/or visual tags, such as for example a third party identifier (third party ID), to identify the third party maintaining the access network, and a tag identifier (tag ID). These pieces of information may be mapped to a geographical location, further mapped to an access network policy that selects a WLAN SSID and WLAN profile that includes authentication type and authentication credentials 70 to allow user terminal 100 to connect to the access network.

In step s60, ANDSF node 200 sends s60$_1$, to user terminal 100, the credentials 70 for enabling user terminal 100 to connect to the access network, and user terminal 100 receives s60$_2$ credentials 70. The electronic tag and/or a visual tag may, in one embodiment, be located within, or in the vicinity of, the area covered by the access network for which the credentials 70 are transmitted.

The credentials 70 transmitted from ANDSF node 200 to user terminal 100 may for example be carried in an ANDSF MO. Credentials may for example comprise an SSID (or a cell ID of a cellular network), a digital key, a username and/or a password to identify and connect to the access network. In one embodiment, the credentials include cyphering keys. In another embodiment, the credentials include a user name and password allowing, through an authentication process by the access network, cyphering keys to be derived and/or acquired.

Like tag information 50, credentials 70 may be transmitted in a message, i.e. a set of bits forming a packet which can be transmitted over a communication network. The credentials 70 may also be transmitted through a series of packets. The credentials 70 may for example be transmitted in an IP packet. The credentials 70 may be transmitted from ANDSF node 200 to user terminal 100 through one or more intermediate network nodes (not illustrated in FIG. 1), such as for example nodes of a cellular access network or packet core network in a mobile or fixed communication network.

User terminal 100 may be any type of communication terminal (or user equipment (UE)) such as, for example, a mobile phone, a smartphone, a laptop, a desktop computer, a tablet PC, a watch phone, a gaming device, an e-book reader, a fixed telephone, etc. In one embodiment, user terminal 100 is a multimode wireless communication device. In one embodiment, user terminal 100 is a device which operation is driven by a human user. In another embodiment, user terminal 100 is self-operable and does not require a human operating the device for communicating with a telecommunications system. User terminal 100 may for example be a smart device.

ANDSF node 200 is a network node, i.e. a control server, from which access network policies determining the access network(s) to which a user terminal 100 should attach can be downloaded. An exemplary ANDSF node 200 is described in reference [1], subclause 4.8.2.1.

In one embodiment, in step s20, tag information 50 is automatically obtained by user terminal 100. The user only needs to approach the user terminal 100 near the electronic tag or visual tag. The tag information 50 is not entered manually by the user by typing it on a keyboard or the like. This solution is convenient for users, it reduces the risks of errors (such as, for example, typing errors), and it does not involve providing secret keys openly to users who could then easily pass the keys on to third parties, so that the solution also reduces the opportunities to set up man-in-the-middle attacks.

In one embodiment, tag information 50 comprises an application Multipurpose Internet Mail Extensions (MIME) type to indicate the nature (i.e., intended usage) of the tag information 50. This assists the user terminal 100 and/or the ANDSF node 200 in properly processing the tag information 50, once obtained or received.

In one embodiment, user terminal 100 is configured to read and parse data stored in an NFC tag (or in another type of electronic tag, or in a visual tag) to identify therein the tag information 50 to be sent to ANSDF node 200. This may include identifying a third party ID and a tag ID that together may form, in one embodiment, tag information 50.

In one embodiment, tag information 50 comprises non-static information that changes with time, such as a time-changing counter, a token, or the like. Such tag information 50 is obtained from the electronic or visual tag and may for example have an expiration time, for security reasons.

In one embodiment, after obtaining s20 the tag information 50, user terminal 100 adds a UE identifier (e.g., IMSI or IMEI) into the tag information 50 before sending s40$_1$ the tag information 50 to ANSDF node 200.

In one embodiment, in step s60, ANDSF node 200 not only sends s60$_1$ credentials 70 to user terminal 100, but also information indicating a period of validity of the credentials 70.

In one embodiment, in step s60, ANDSF node 200 not only sends s60$_1$ credentials 70 to user terminal 100, but also policy information indicating that connecting to the access network for which the credentials 70 are transmitted is preferred over other access networks. A period of validity of the policy information may also be transmitted. In one embodiment, the policy information comprises a prioritized list of access networks, with higher-priority access networks, to which user terminal 100 should preferably attach, and lower-priority access networks. In order to establish the prioritized list of access networks available for user terminal 100, ANDSF node 200 may determine, based on the received tag information, the location of the tag and, accordingly, the location of user terminal 100 (since, typically, a short distance between the user terminal and the tag is required for reading the tag information).

In one embodiment, ANDSF node 200 generates a username and a password, being valid for a given period of time, and ANDSF node 200 provisions such username and password to an AAA server in a third-party domain. This enables a mutual authentication process to be later carried out between a user terminal 100 and the AAA server (for example through a WLAN access point).

In one embodiment, the tag information obtained from the electronic and/or visual tag is channeled through user terminal 100 to ANDSF node 200 without being normally possible for a user to intercept the tag information. The goal is to prevent the distribution of secret keys to other users. In an exemplary scenario, if user A makes a purchase, the person at the counter allows only user A's user terminal to read the tag, so that only user A can benefit from the access network connectivity (in this case, the distribution of secret keys to other users is prevented). This contrasts with a conventional method where the person at the counter would print a ticket with a username and a password or the secret key of a WiFi and would give the printed ticket to user A (the person who has made the purchase). If user A is not interested in WiFi connectivity (perhaps he has a flat cellular rate), he could pass the ticket on to user B who is looking for WiFi connectivity, but has not made a purchase (namely, in this case, the distribution of secret keys to other users is not prevented).

In one embodiment, the method assists a user terminal 100 in connecting to an access network being a LAN interoperable with IEEE 802.3 standards (Ethernet). Stationary devices may notably benefit from this embodiment to relieve the burden of provisioning the devices or to dynamically manage the resources depending on the network congestion. For example, when devices capable of connecting to a plurality of access networks (e.g., Ethernet and WiFi) are deployed, it may be necessary to configure that some IP flows are sent over one access network (e.g., Ethernet) and some other flows over another access network (e.g., WiFi). Configuring which flow is sent over which access network may be a tedious, time-consuming, and error-prone process. In order to ease the configuration, the person who deploys the device may approach the electronic tag (e.g., a NFC tag) or visual tag near the device to trigger the download of policies from the ANDSF node 200 to the device 100.

Figure 2:
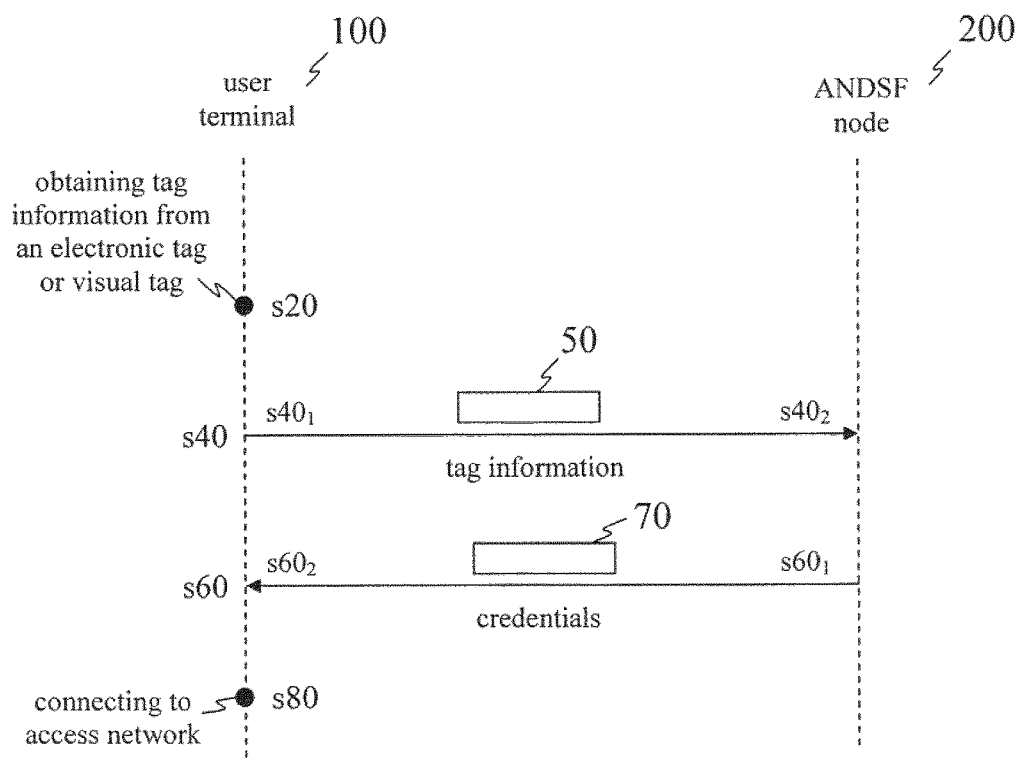
FIG. 2 is a message sequence chart of a method in one embodiment of the invention, comprising a step of connecting, by a user terminal, to an access network.

FIG. 2 is a message sequence chart of a method in one embodiment of the invention, which differs from the method illustrated in FIG. 1 in that, after step s60 of transmitting from ANDSF node 200 to user terminal 100, the credentials 70, user terminal 100 connects s80 to the access network using the transmitted credentials 70. This enables to effectively and securely offload the communications from user terminals 100 to the access network. The access network may be owned, deployed and controlled by the operator to which user terminal 100 is a subscriber. The access network may alternatively be owned and managed by a third party (i.e., a third-party access service provider), with which the operator may have a roaming agreement. Telecom operators may make roaming agreements with third party maintaining WLANs, allowing the users to be always connected, even in indoor places, subway stations, and other places where typical cellular coverage is not always granted.

The step of connecting s80 to the access network using the transmitted credentials 70 is optional. For example, upon receiving the credentials 70, the user terminal 100 may instead store the credentials for a later connection, if wished, to the access network.

Now, to further understand the advantages of the invention, the context in which some embodiments of the invention have been developed and may be put into practice will be explained in more detail, followed by the description of further embodiments.

The ANDSF entity is a functionality whose main purpose lies in the selection of an access network for the device to connect to a given network (typically this network is the Internet). As explained in the "Background" section, the ANDSF functionality is notably discussed in references [1], [2] and [3]. An S14 reference point is defined between the ANDSF and the user terminal (or UE), so that the ANDSF can push policies that the UE should enforce, or the UE can pull those policies from the ANDSF. The ANDSF policies may be sorted by priority. Each policy identifies one or more access networks (also sorted by priority) that the UE should try to connect to at a given time.

Let us now discuss some of the problems addressed by embodiments of the invention, for further understanding the context in which some embodiments of the invention have been developed.

Some embodiments of the invention address the problems in the following exemplary scenario or in similar scenarios. Let us assume that, for example, a restaurant provides free WLAN Internet connectivity to its customers. It is desired that the restaurant's customers are offered free WLAN Internet connectivity during a period of time (e.g., one hour) after ordering a meal or making a purchase. To do so, the restaurant may have set up an open unprotected WLAN access together with a portal where customers can log in and authenticate. At the time when the customer orders a meal or makes a purchase, a ticket is printed indicating the SSID of the WLAN to which the customer should connect, together with a randomly generated username and password that the customer should use. At the same time, an AAA server in the WLAN network is provisioned with this username and password, and a period of time, e.g. one hour, during which the username and password are valid.

Then, the customer has to scan the WLAN networks detected by his device, select the SSID that he learned from the printed ticket, and launch a web browser towards a web site. The connection is then redirected to the portal where he can authenticate with the username and password he was provided with on the printed ticket. Assuming that the customer made no mistakes, the customer is authenticated, granted access to Internet, and finally connected to the desired web site.

This practice is cumbersome and has a number of limitations:

(a) The process is prone to errors. Errors may be made upon selecting the SSID of the WLAN or when entering the user name and the password (b) The WLAN network does not offer confidentiality. The network has to be open. It cannot be cyphered with, e.g., WPA2-PSK using AES encryption, or something similar, because then the secret would have to be publicly known for all users so that they can associate to the WLAN prior to authenticating them. Lack of confidentiality opens the door to a number of privacy and security attacks.

(c) The user cannot authenticate the WLAN network. It is therefore possible that someone impersonates the SSID of the network and launches a man-in-middle attack towards the users of the network. This is easy in a public place, since anyone can use his mobile phone, in tethering mode, to impersonate the SSID of the WLAN Internet service provider, and log all the packets of users connected thereto.

Figure 3A:
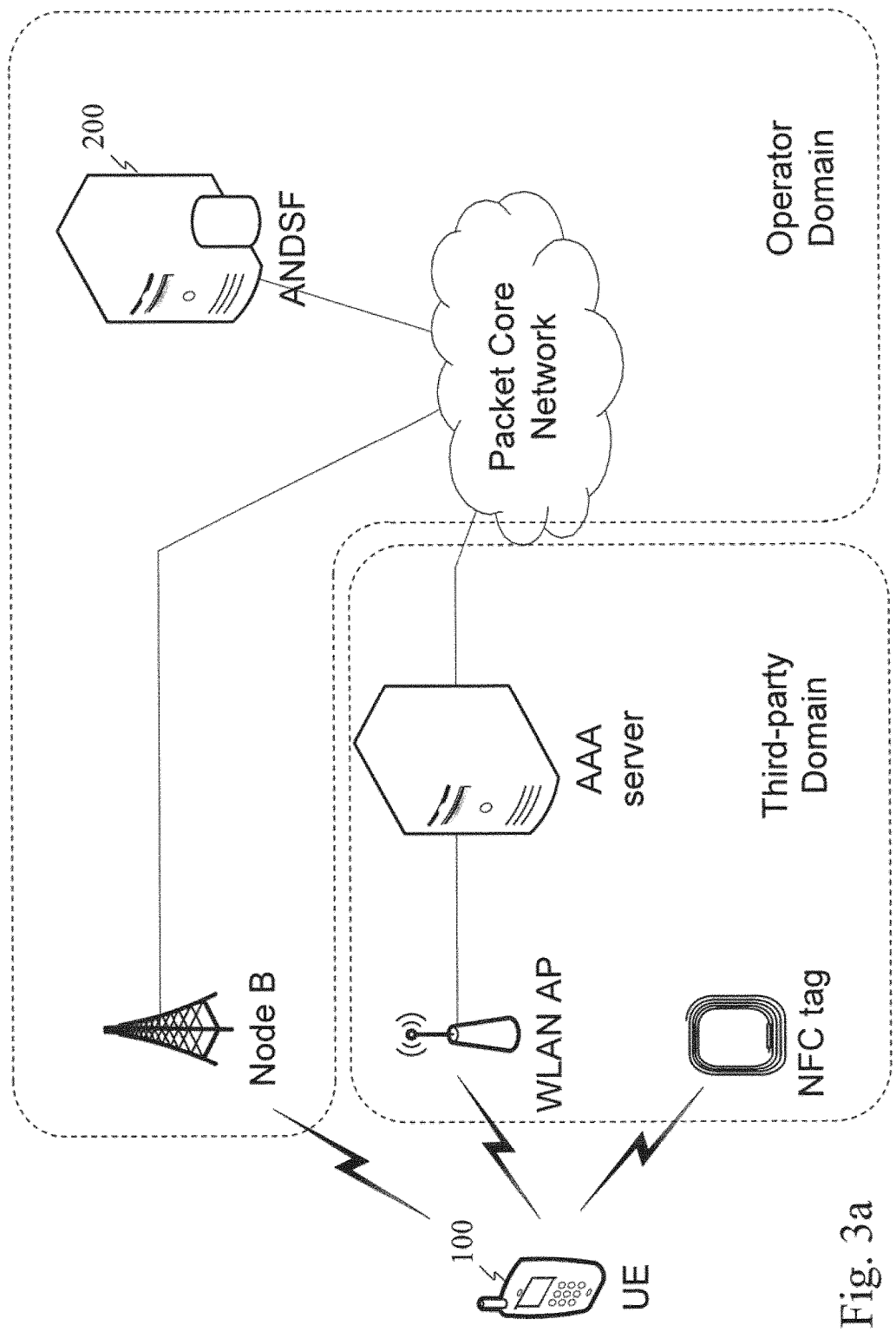
FIGS. 3a, 3b, and 3c schematically illustrate network architectures in three embodiments of the invention, to enable a user terminal to obtain tag information from a NFC tag, or from a one- or two-dimensional barcode respectively.
Figure 3B:
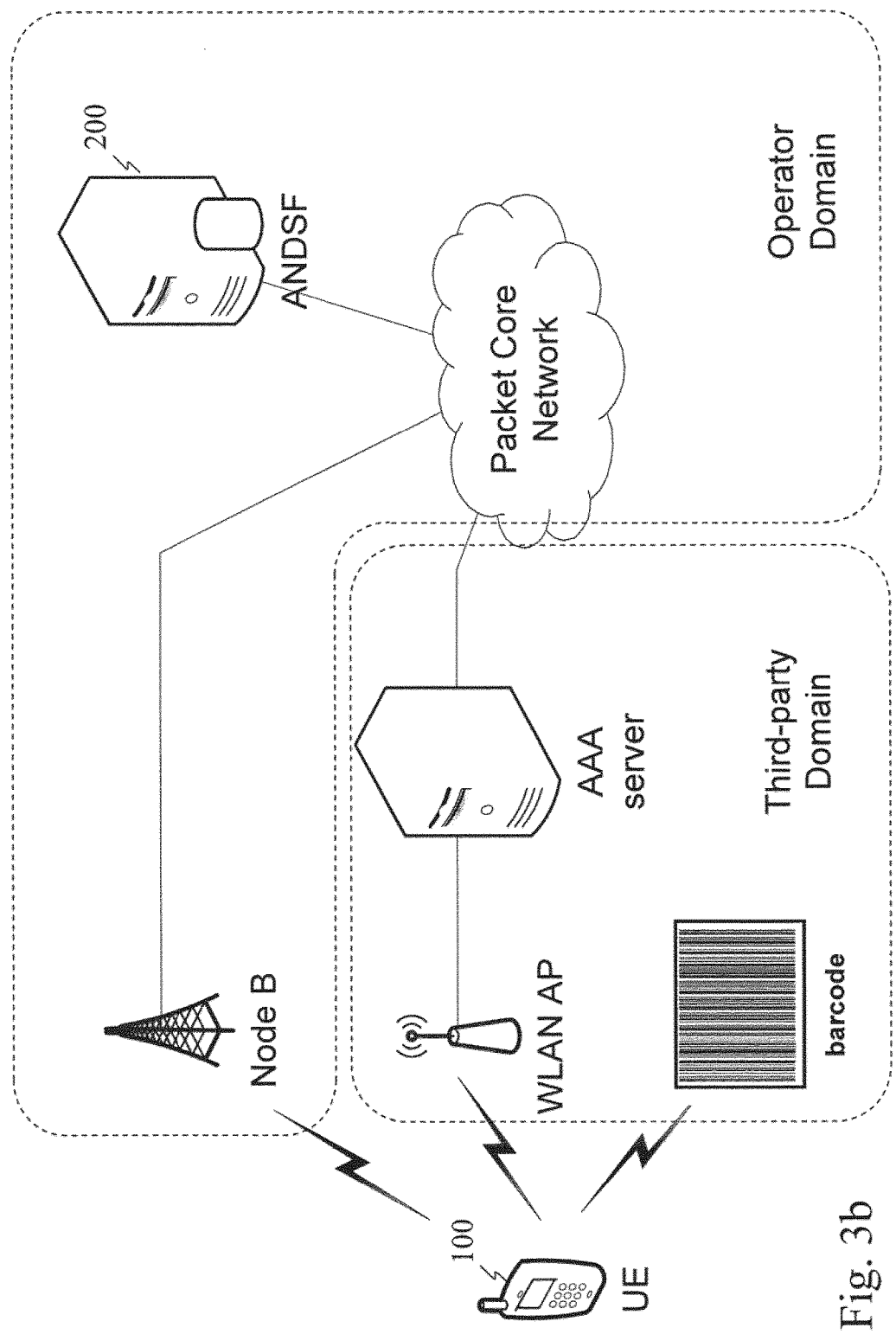
Figure 3C:
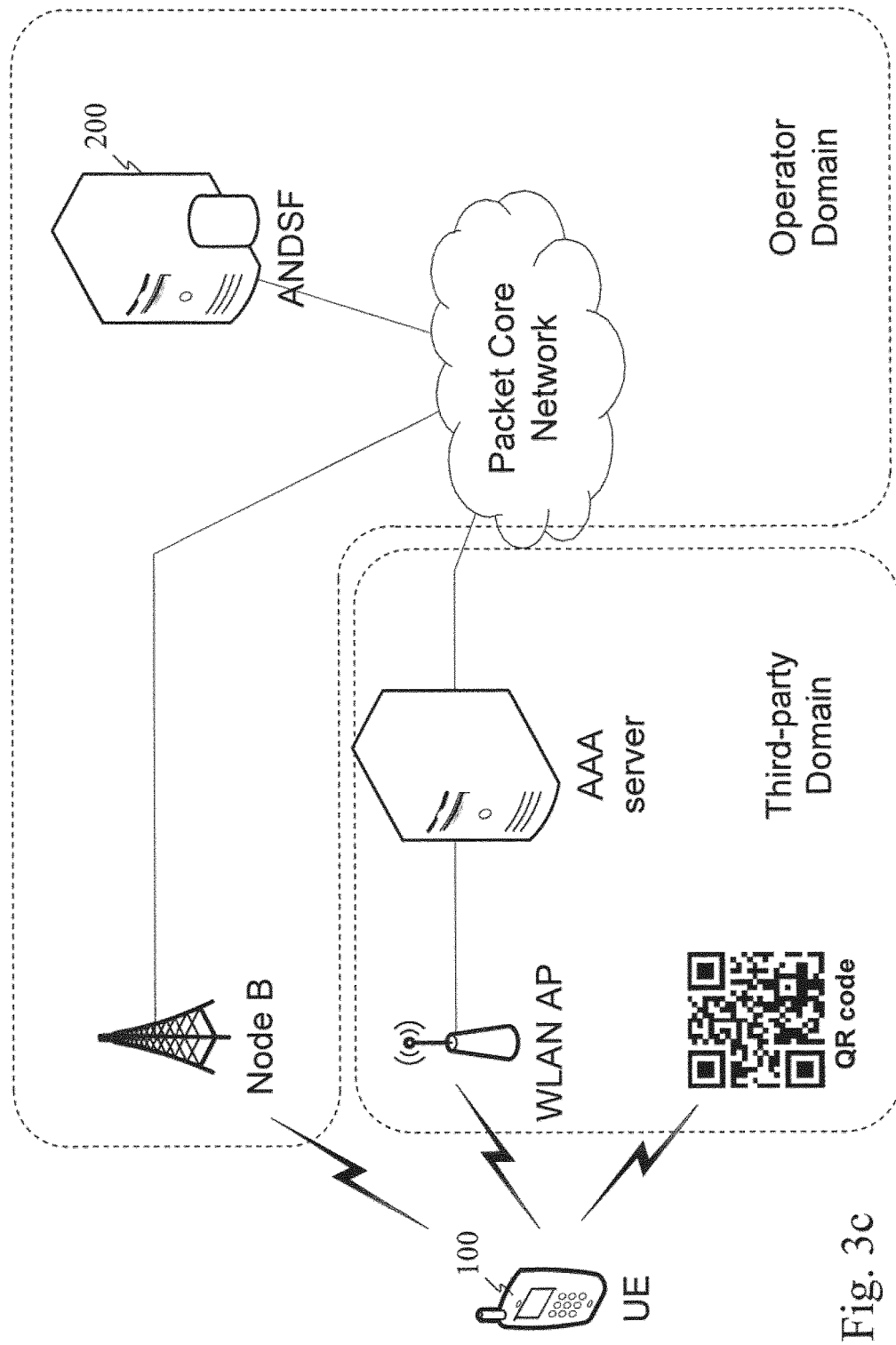

Some embodiments of the invention solve the above-described problems by means of network architectures and network elements, such as those schematically illustrated in any one of FIGS. 3a, 3b and 3c.

Let us first describe the network architecture schematically illustrated in FIG. 3a, involving a combination of technologies, namely: (i) a packet core network, (i) a cellular radio access network (RAN) comprising a Node B and connected to the packet core network, (iii) an ANDSF node 200 connected to the packet core network, (iv) an server connected to the packet core network, (v) an WLAN access point (AP) connected to the packet core network through the AAA server, and (vi) a near field communication (NFC) tag. The user terminal 100 (labelled "UE" in FIG. 3a) is capable of connecting to the Node B in the operator domain (providing a 3GPP access), and to a NFC tag in the third party domain (providing a non-3GPP access, such as a Wi-Fi or WiMAX access). User terminal 100 is also capable of obtaining (or, in particular, reading) information from the NFC tag, i.e. user terminal 100 is NFC-enabled.

The NFC technology is used to ease the process of entering data to the user terminal 100. Users simply need to approach their user terminal 100 from an NFC tag which may be placed, for example, on the front desk of the third-party WLAN provider (e.g., on the restaurant counter). The tag information in the NFC tag is obtained (or, in particular, read) by user terminal 100. Then, an ANDSF client hosted on user terminal 100 requests policies to ANDSF node 200 and, when doing so, sends the tag information obtained from the NFC tag.

In advance of receiving of tag information from a user terminal 100, ANDSF node 200 should be provisioned to, i.e. should have access to, the tag information of the NFC tag, along with information about the location of the corresponding NEC tag and the associated third-party access network (such as for example WLAN network). Thus, when ANDSF node 200 receives an ANDSF request from user terminal 100 indicating that user terminal 100 is located in the vicinity of the NFC tag, ANDSF node 200 creates a policy that indicates the associated WLAN network as the highest priority, and sends the information to user terminal 100. The ANDSF node 200 is also provisioned with the credentials that are required to connect to the third-party WLAN access network, and ANDSF node 200 also sends these credentials along with the policy to user terminal 100. Information indicating for how long the policy and/or credentials are valid, such as for example one hour, may also accompany the policy.

Upon receiving the response from ANDSF node 200, user terminal 100 applies the received policies for selecting an access network, and uses the received credentials for connecting to the WLAN network (labelled "WLAN AP" in FIG. 3a) for the period during which the policy is valid. An authentication procedure through the server takes place.

FIGS. 3b and 3c schematically illustrate that the NFC tag may be replaced, in some embodiments of the invention, with a linear barcode (FIG. 3b) or a two-dimensional barcode or QR code (FIG. 3c).

Although FIGS. 3a, 3b and 3c each disclose one user terminal 100 (UE), one electronic or visual tag, one WLAN AP, one AAA server, one Node B, and one ANDSF node 200, the invention also covers network architectures involving more than one user terminal 100 (UE), more than one electronic or visual tag, more than one WLAN AP, more than one AAA server, more than one Node B, and more than one ANDSF node 200.

Figure 4:
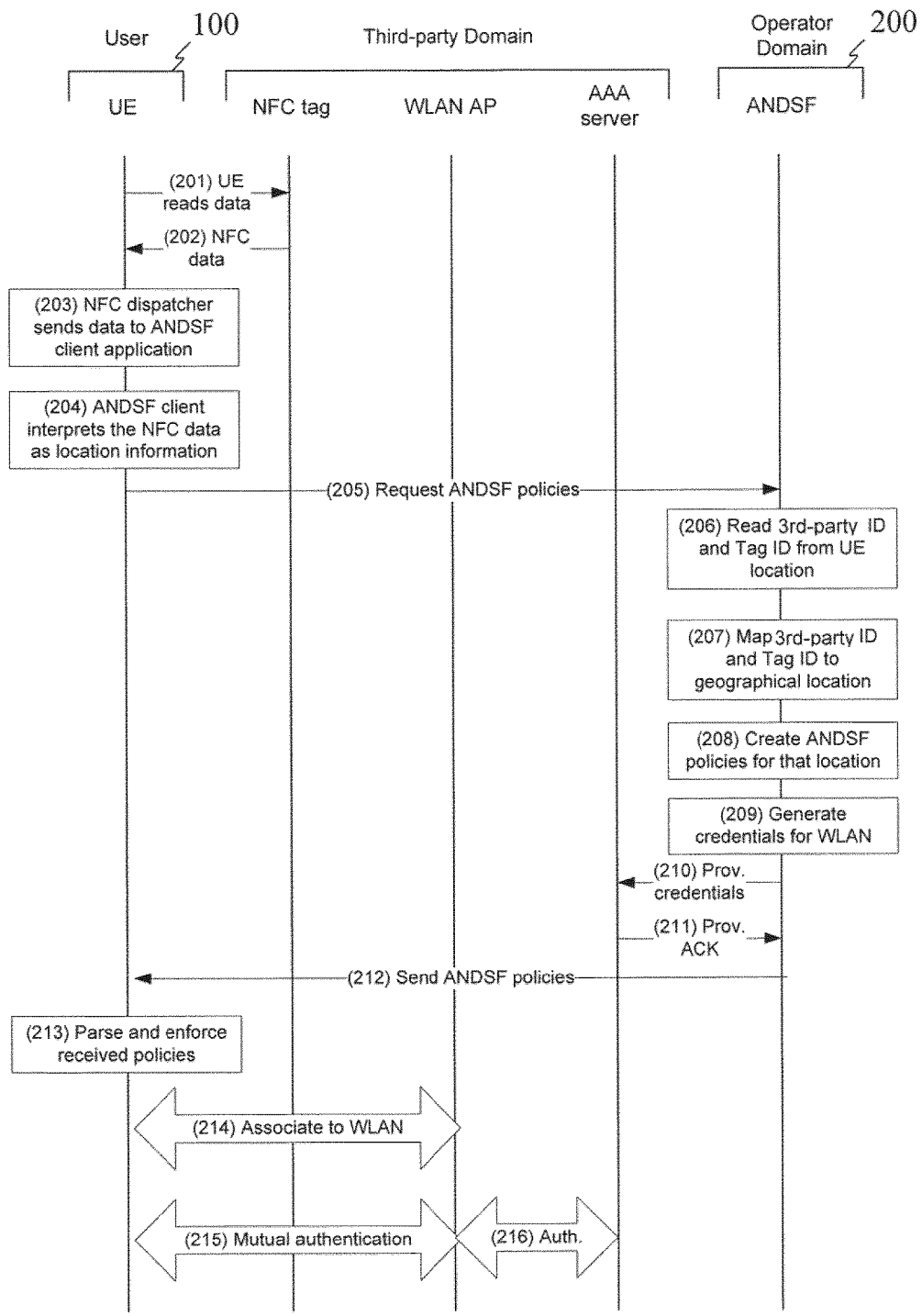
FIG. 4 is a message sequence chart of a method in one embodiment of the invention.

FIG. 4 is a message sequence chart of a method in one embodiment of the invention, involving a NEC tag. The method comprises the following steps:

(step 1) The third-party WLAN network (the corresponding access point is labelled "WLAN AP" in FIG. 4) is configured to use cyphering and mutual authentication; the user authenticates the network; and the network authenticates the user. The network offers a certificate, so that users can authenticate the network. For authenticating users, the network may use either EAP-TTLS (requires the device to supply a username and a password), or WPA2-PSK (requires the device to supply a shared secret). In the following, it is assumed that EAP-TTLS is used, so that a different username/password per user is used. Other authentication methods offering the same level of security or a different level of security may replace any of these authentication methods.

(step 2) The third-party contact point (e.g. the restaurant counter) is equipped with an NFC tag. In its simplest form, an NFC tag is a passive device that, once energized from a close-in-distance NFC reader (such as a user terminal 100, labelled "UE" in FIG. 4), can supply a small amount of data to the reader. The NFC tag is provisioned with NFC data representing: a unique third-party ID (that differentiates this third party from other third parties), a unique tag ID (that differentiates this NEC tag from other NFC tags of the same third party), together with an application MIME type (that identifies the intended usage of the data on this NFC tag). For example, the MIME type can be set to application/vnd.network.andsf. The MIME type helps the NFC dispatcher application in the user terminal 100 to dispatch the read data to the correct application, in this case, the ANDSF client running in the user terminal 100.

(step 3) The ANDSF node 200 (hosting an ANDSF server application) is provisioned with data pertaining to each of the deployed NFC tags. In particular, for each NEC tag, the ANDSF node 200 is provisioned with the tag information (third party ID and NEC tag ID), together with its location information, for example, geographical coordinates, altitude, etc. This allows the ANDSF node 200 to identify the geographical location of each NFC tag.

(step 4) The ANDSF node 200 is provisioned with data pertaining to the WLAN characteristics of the WLAN connectivity supplier. In particular, the ANDSF is provisioned with the geographical location and the area of coverage of this WLAN, broadcasted SSID, used authentication method in this WLAN, required credentials to access this network, etc.

(step 5) At the time of making a purchase, the third party contact point offers the user to approach his NFC-enabled user terminal 100 to the NEC tag for automatic WLAN Internet access during an hour. The user approaches his user terminal 100 to the NEC tag (as illustrated by the arrow labelled "(201) UE reads data" on FIG. 4), and the NFC tag sends the NFC data (as illustrated by the arrow labelled "(202) NEC data") to the NFC dispatcher application within user terminal 100. This step corresponds to step s40 discussed above with reference to FIGS. 1 and 2. The NFC dispatcher application reads the MIME type and dispatches the NFC data to the ANDSF client (as illustrated by the box labelled "(203) NEC dispatcher sends data to ANDSF client application") within user terminal 100. This is because when the ANDSF client application was launched, it registered with the NEC dispatcher for receiving data of a given MIME type, in this case for example, application/vnd.network.andsf.

(step 6) The ANDSF client within user terminal 100 receives the NEC data and processes it (as illustrated by the box labelled "(204) ANDSF client interprets the NEC data as location information"). On one hand, the ANDSF client interprets the received NEC data as a location (third party ID and tag ID). On the other hand, the ANDSF client requests policies to the ANDSF node 200 (as illustrated by the arrow labelled "(205) Request ANDSF policies"), which may be effectively an HTTP request. When requesting policies, the ANDSF client includes a UE_Location information field. In this case, the UE location information field includes said third party ID and tag ID, besides any other UE_Location information that user terminal 100 may include (e.g., 3GPP Cell-ID). Additionally, the NEC data included in the HI IP request may also be completed with a timestamp indicating the time at which the NEC tag was read. This step corresponds to step s40 discussed above with reference to FIGS. 1 and 2.

(step 7) Upon receiving the HTTP request, ANDSF node 200 extracts the values of the third party ID and tag ID in the UE_Location information element sent by user terminal 100 (as illustrated by the box labelled "(206) Read 3rd-party ID and Tag ID from UE location"). Then, ANDSF node 200 queries its provisioned data and, based thereon, determines the geographical location of user terminal 100.

(step 8) ANDSF node 200 then maps the read third-party ID and tag ID to a location of user terminal 100 (as illustrated by the box labelled "(207) Map 3rd-party ID and Tag ID to geographical location"). As a result, ANDSF node 200 has accurately determined the geographical location of user terminal 100 from the received third-party ID and tag ID.

(step 9) Then, considering the location of this user terminal 100, ANDSF node 200 creates a policy that is suitable for that user terminal 100 in that location. In particular, ANDSF node 200 creates a high-priority policy that makes the user terminal 100 select the SSID of the WLAN deployed by the third party in its premises (as illustrated by the box labelled "(208) Create ANDSF policies for that location"). The ANDSF node 200 also includes in this policy the authentication type (e.g., WEP, WPA2-PSK, open, EAP-TTLS, etc.), authentication credentials, and any other relevant information that user terminal 100 may require to connect to this WLAN (as illustrated by the box labelled "(209) Generate ANDSF policies for that location"), as well as time information that determines the period of time during which this policy is valid.

(step 10) The username and password that each user terminal 100 needs to authenticate to the WLAN network may be generated automatically by ANDSF node 200. EAP-TTLS may for example be used for authentication. In such case, when ANDSF node 200 has generated the credentials (username and password) that allow user terminal 100 to connect to the WLAN, ANDSF node 200 provides these credentials as valid ones for the period of allowance to this WLAN, for example one hour. Thus, ANDSF node 200 contacts the AAA server in the third party network (as illustrated by the arrow labelled "(210) Prov. credentials") to provision these new credentials. The AAA server acknowledges the creation of these credentials for a limited period of time (as illustrated by the arrow labelled "(211) Prov. ACK").

(step 11) Eventually, ANDSF node 200 sends a response (as illustrated by the arrow labelled "(212) Send ANDSF policies") to the HTTP request. The response comprises a set of policies, among which one policy at least has a high priority (higher than other policies), refers to the selection of the third party WLAN, provides the credentials needed for user terminal 100 to authenticate to that WLAN access network, and sets the period of validity of this policy. This step corresponds to step s60 discussed with reference to FIGS. 1 and 2.

(step 12) When user terminal 100 receives this set of policies, the ANDSF client within user terminal 100 assesses the validity of policy for example in accordance with procedures described in reference [3], subclauses 4.1.2 and 4.1.5 (as illustrated by the box labelled "(213) Parse and enforce received policies"). Assuming that the policy with the highest priority is the one that selects the third party WLAN network, user terminal 100 initiates the association to that WLAN (as illustrated by the bi-directional arrow labelled "(214) Associate to WLAN"). This step corresponds to step s80 discussed with reference to FIG. 2.

(step 13) Once the association to the WLAN is completed, the WLAN attempts to authenticate the client, and the client attempts to authenticate the WLAN network (as illustrated by the bi-directional arrow labelled "(215) Mutual authentication"). If the authentication mechanism requires one different username and password per user, the WLAN AP contacts an AAA server (as illustrated by the bi-directional arrow labelled "(216) Auth.") to request authentication and authorization for the username and password supplied by user terminal 100. Since those were previously provided by ANDSF node 200 in step "(210)", along with a validity time of those credentials, the AAA server grants access to user terminal 100 to the WLAN for that period of time.

User terminal 100 is then authenticated and can access the packet core network (for example for using Internet services).

Periodically, a policy manager (which forms pail of the ANDSF client running in the user terminal 100) may analyse whether the current policy is still valid. In this case, the policy has a period of validity (for example, one hour). When this period of time expires, the policy becomes invalid, and the policy manager in user terminal 100 un-provisions, i.e. removes, the credentials that were previously stored in user terminal 100 in order to access this WLAN network. For example, a file (stored in user terminal 100), such as an XML file, which had been manipulated by the policy manager to provision credentials to access the WLAN network, is again manipulated when the policy expires. Namely, the policy manager deletes the credentials from this same file, to which the user has normally no access. This precludes the user terminal 100 to keep being connected to, or to later re-connect, to this WLAN once the period of validity has expired.

Additionally, since the ANDSF node 200 provided (i.e., provisioned) the credentials to the AAA server for a limited period of time, when the credentials expire, the server can request the WLAN AP to re-authenticate the user terminal 100. If user terminal 100 supplies the former username and password, the AAA server rejects authorization, and user terminal 100 is denied the connection to the WLAN.

The steps described with reference to FIG. 4 need not necessarily be carried out in the above-described order. For example, steps 1, 2, 3, and 4 may be performed in a different order or in parallel.

In one embodiment, the ANDSF S14 interface specified in reference [3] is extended to include UE_Location expressed in terms of NFC data, i.e. for example third party ID and tag ID pertaining to an NFC tag. Reference [3] describes the ANDSF Management Object (MO), a set of information elements that are exchanged between user terminal 100 and ANDSF node 200 for providing location or UE Profile (from UE to ANDSF), and policies and discovery information (from ANDSF to UE).

Figure 5:
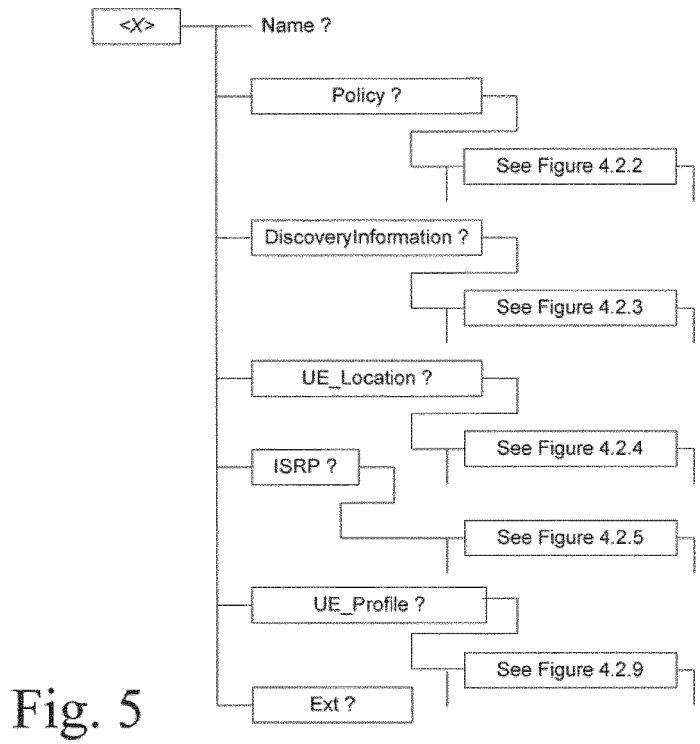
FIG. 5 schematically illustrates the structure of a conventional ANDSF Management Object (MO), in order to assist in understanding the context in which some embodiments of the invention have been developed.

The ANDSF MO is divided in five groups of information: UE_Location, Inter-System Mobility Policies (ISMP), Inter-System Routing Policies (ISRP), Discovery Information, and UE Profile. We here focus on the UE_Location. FIG. 5 shows the high-level structure of the ANDSF MO according to reference [3]. In this respect, the user terminal 100, depending on its capabilities, prioritizes the access network using the ISMP, when the user terminal 100 is not capable to connect simultaneously through multiple accesses, or using ISRP, when the user terminal 100 is capable to connect simultaneously through multiple accesses. For the purpose of the present invention, the policies submitted from ANDSF node 200 to the user terminal 100 may be, in particular, any one of ISMP or ISRP, or both if ANDSF node 200 is not aware of the capabilities of the user terminal 100.

Figure 6:
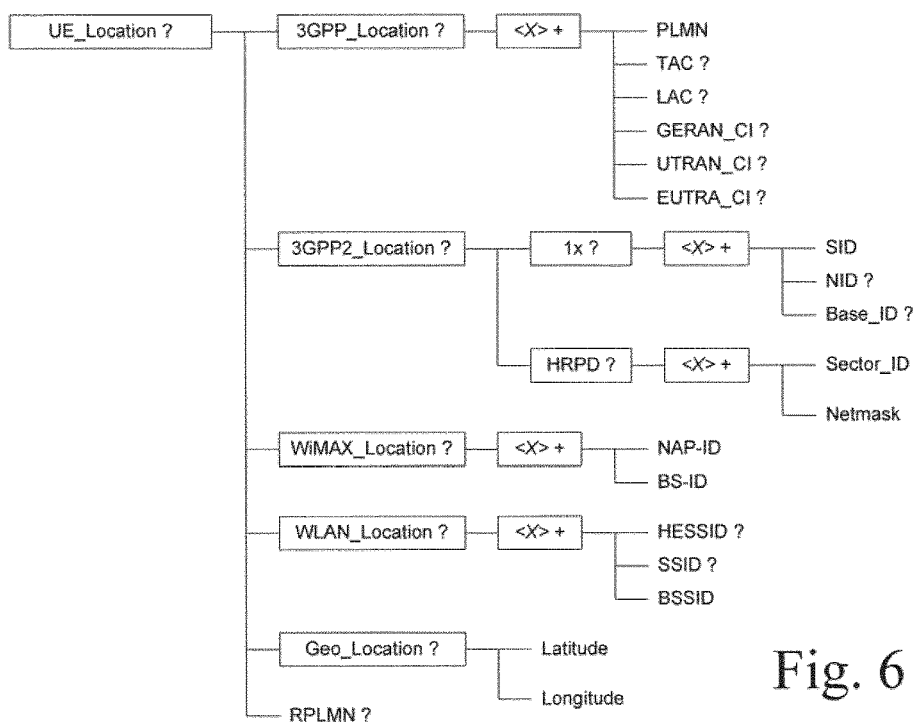
FIG. 6 schematically illustrates the structure of the UE_Location portion of a conventional ANDSF MO, in order to assist in understanding the context in which some embodiments of the invention have been developed.

User terminal 100 populates the UE_Location information element whenever it sends a request for policies to ANDSF node 100. Currently, the UE_Location information may contain location information expressed as a combination of:

3GPP cellular location: PLMN, LAC, TAC, Cell ID
  3GPP2 cellular location: SID, NID, Base Number, Sector ID, Netmask
  WiMAX location: NAP-ID, BS-ID
  WLAN location: HESSID, SSID, BSSID
  Geographical location: longitude, latitude FIG. 6 shows the structure of the UE_Location portion of the ANDSF MO, according to reference [3].

Figure 7:
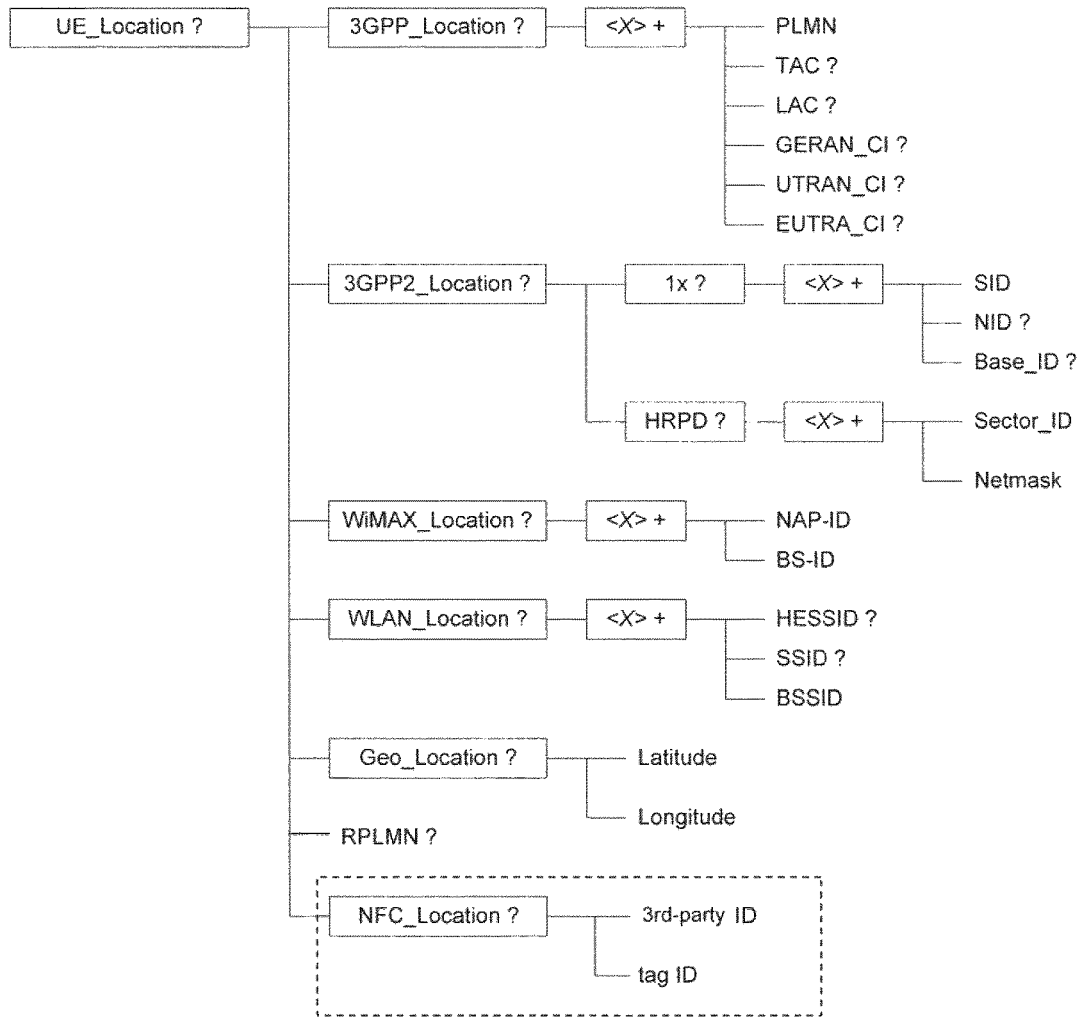
FIG. 7 schematically illustrates the structure of the UE_Location portion of an ANDSF MO in one embodiment of the invention.

Some embodiments of the invention extend the UE_Location with new "NFC Location" information element, which is a placeholder for a third party ID and a tag ID. FIG. 7 shows the structure of the extended UE_Location of the ANDSF MO, where the new information elements are surrounded by a dotted rectangle.

Whenever user terminal 100 launches a request to ANDSF node 200, it includes a UE_Location as part of the ANDSF MO. The UE_Location contains the NFC Location information as earlier described.

The embodiments schematically illustrated in FIGS. 3*b* and 3*c* and already discussed above are particularly advantageous for user terminals that do not have a built-in NFC reader, and thus cannot benefit from the advantages of the embodiments illustrated with reference to FIG. 3*a*. Rather than using NFC technology when the user is making a purchase at the third party contact point, a cash machine may for example print a ticket, or may display on a screen, a barcode (FIG. 3*b*) or a QR code (FIG. 3*c*). The QR code stores essentially the same information as the information stored on the NFC tag, namely a third party ID and a tag ID. The QR code contains a differentiating content type (for example, a MIME type application/vnd.network.andsf) so that the information, once scanned with, for example, a camera or a barcode reader, can be easily dispatched to the ANDSF application running on the user terminal.

Once the ANDSF application on the user terminal has decoded and read the QR code or barcode, or once the ANDSF application on the user terminal has received this information from the QR code or barcode reader application, the rest of the process is the same as in the embodiment illustrated with reference to FIG. 4.

Thus, in some embodiments of the invention, operators may offload data traffic to third-party access networks for which, for example, data roaming agreements exists. In some embodiments, operators can control and configure automatically the user terminals that are allowed to access the third-party WLAN. This allows the WLAN network in the third-party domain to be secured with an individual username/password combination per user.

Figure 8:
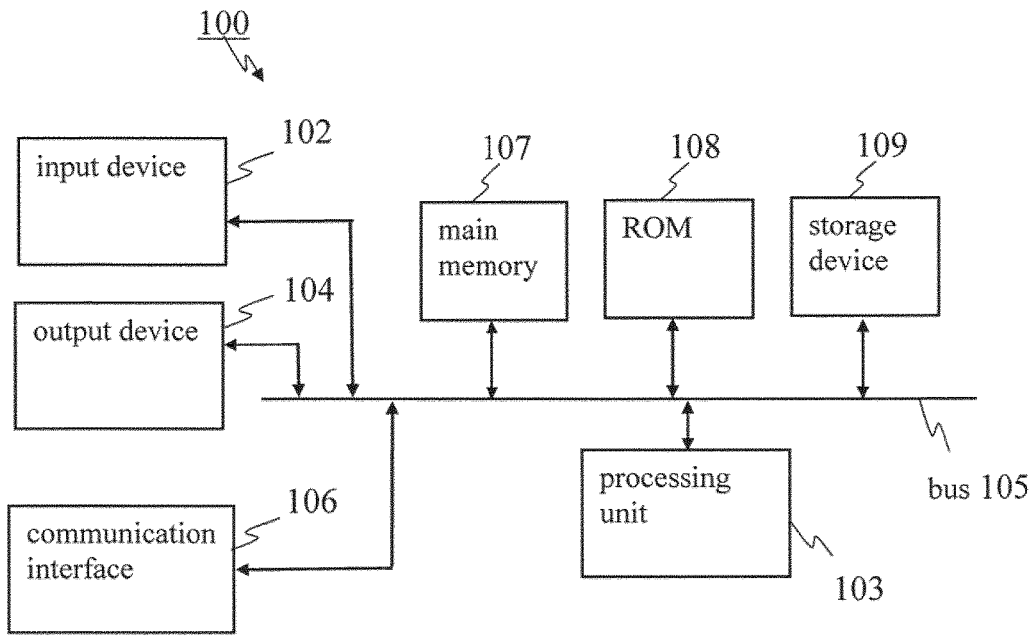
FIG. 8 is a schematic diagram of an exemplary implementation of a user terminal according to one embodiment of the invention.

FIG. 8 is a schematic diagram of an exemplary implementation of a user terminal 100 that may be used in embodiments of the invention. As illustrated, user terminal 100 may include a bus 105, a processing unit 103, a main memory 107, a ROM 108, a storage device 109, an input device 102, an output device 104, and a communication interface 106. Bus 105 may include a path that permits communication among the components of user terminal 100.

Processing unit 103 may include a processor, a microprocessor, or processing logic that may interpret and execute instructions. Main memory 107 may include a RAM or another type of dynamic storage device that may store information and instructions for execution by processing unit 103. ROM 108 may include a ROM device or another type of static storage device that may store static information and instructions for use by processing unit 103. Storage device 109 may include a magnetic and/or optical recording medium and its corresponding drive.

Input device 102 may include a mechanism that permits an operator to input information to user terminal 100, such as a keypad, a keyboard, a mouse, a pen, voice recognition and/or biometric mechanisms, etc. Output device 104 may include a mechanism that outputs information to the operator, including a display, a printer, a speaker, etc. Communication interface 106 may include any transceiver-like mechanism that enables user terminal 100 to communicate with other devices and/or systems (such as with a base station, a WLAN access point, an ANDSF node 200, etc.). For example, communication interface 106 may include mechanisms for communicating with another device or system via a network.

User terminal 100 may perform certain operations or processes described herein. These operations may be performed in response to processing unit 103 executing software instructions contained in a computer-readable medium, such as main memory 107, ROM 108, and/or storage device 109. A computer-readable medium may be defined as a physical or a logical memory device. For example, a logical memory device may include memory space within a single physical memory device or distributed across multiple physical memory devices. Each of main memory 107, ROM 108 and storage device 109 may include computer-readable media. The magnetic and/or optical recording media (e.g., readable CDs or DVDs) of storage device 109 may also include computer-readable media. The software instructions may be read into main memory 107 from another computer-readable medium, such as storage device 109, or from another device via communication interface 106.

The software instructions contained in main memory 109 may cause processing unit 103 to perform operations or processes described herein, such as sending tag information to an ANDSF node or receiving credentials from an ANDSF node. Alternatively, hardwired circuitry may be used in place of or in combination with software instructions to implement processes and/or operations described herein. Thus, implementations described herein are not limited to any specific combination of hardware and software.

Figure 9:
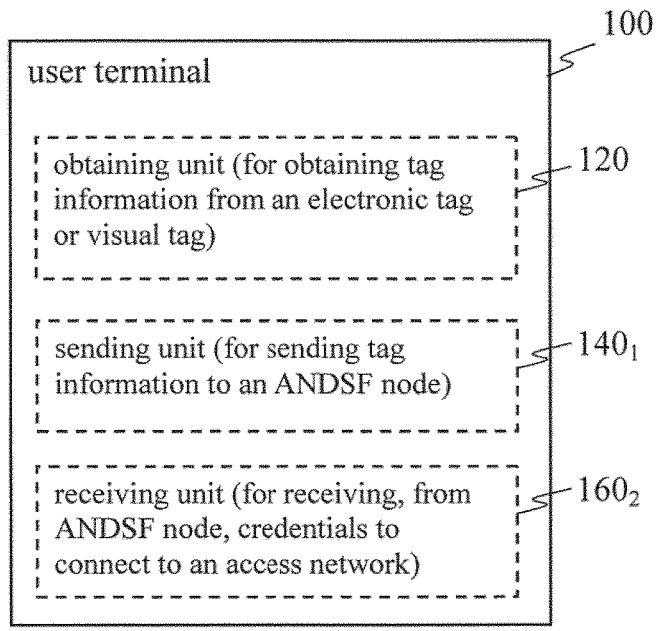
FIG. 9 schematically illustrates a user terminal in one embodiment of the invention.

FIG. 9 schematically illustrates a user terminal 100 in one embodiment of the invention. The user terminal 100 illustrated on FIG. 9 may for example be implemented as illustrated on FIG. 8.

User terminal 100 comprises a so-called obtaining unit 120 (or, in particular, a reader 120), a so-called sending unit 140$_1$, and a so-called receiving unit 160$_2$. Obtaining unit 120 (or, in particular, the reader 120) is configured to obtain tag information 50 from at least one of an electronic tag (which may for example comprise a NFC tag or a RFID tag) and a visual tag (which may for example comprise a barcode, such as a linear barcode and a two-dimensional barcode). Obtaining unit 120 (or, in particular, the reader 120) may for example comprise a NFC reader, a RFID reader, a camera and/or a barcode scanner. Sending unit 140$_1$ is configured to send, to an ANDSF node 200, the tag information 50. Receiving unit 160$_2$ is configured to receive, from the ANDSF node 200, credentials 70 for allowing the user terminal 100 to connect to the access network.

In one embodiment (not illustrated in FIG. 9), sending unit 140$_1$ is configured to send the tag information 50 to the ANDSF node 200 in an ANDSF Management Object (MO). Sending unit 140$_1$ may for example be configured to send tag information 50 as an information element of the UE_Location node subtree of the ANDSF MO.

In one embodiment (not illustrated in FIG. 9), sending unit 140$_1$ is configured to send tag information 50 to ANDSF node 200 with an application MIME type.

In one embodiment (not illustrated in FIG. 9), receiving unit 160$_2$ is configured to receive the credentials 70 from ANDSF node 200 in an ANDSF MO.

In one embodiment (not illustrated in FIG. 9), receiving unit 160$_2$ is further configured to receive, from ANDSF node 200, information indicating a period of validity of the credentials 70.

In one embodiment (not illustrated in FIG. 9), receiving unit 160$_2$ is further configured to receive, from ANDSF node 200, policy information indicating that connecting to the access network for which the credentials 70 are received is preferred over other access networks. The policy information may indicate a period of validity of the policy information.

Figure 10:
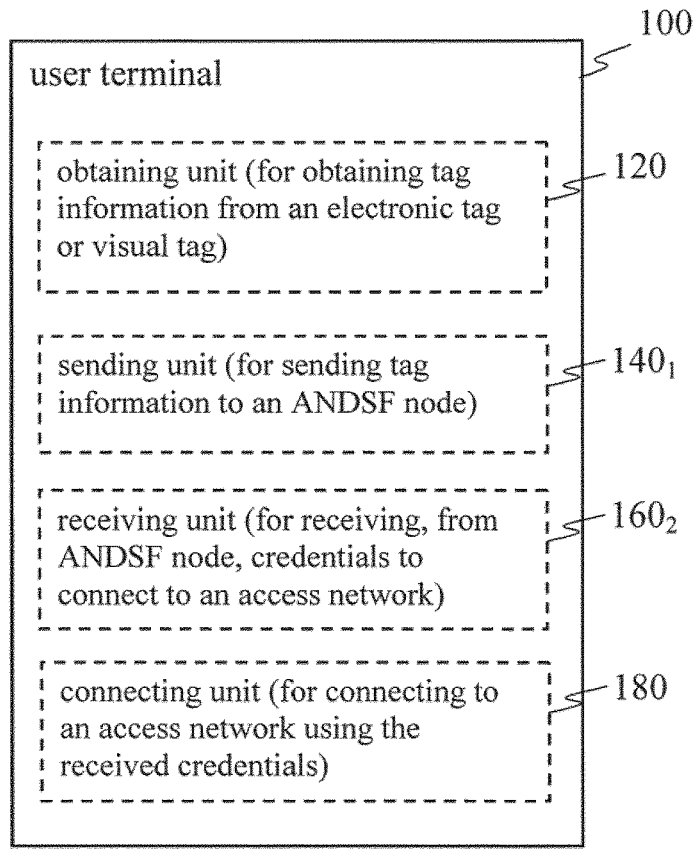
FIG. 10 schematically illustrates a user terminal in one embodiment of the invention, comprising a connecting unit for connecting to an access network.

FIG. 10 schematically illustrates, as one embodiment of the invention, a user terminal 100, which differs from the one illustrated in FIG. 9 in that it further comprises a so-called connecting unit 180 configured to connect to the access network using the transmitted credentials 70. User terminal 100 need not have a connecting unit 180 for any access network technology. If the user terminal 100 has no connecting unit 180 for a non-3GPP access network for which credentials are received (i.e. user terminal 100 is not able to communicate with that non-3GPP access network), then user terminal 100 cannot connect to that access network. User terminal 100 may then carry on communicating through the 3GPP cellular access network to reach the packet core network.

Figure 11:
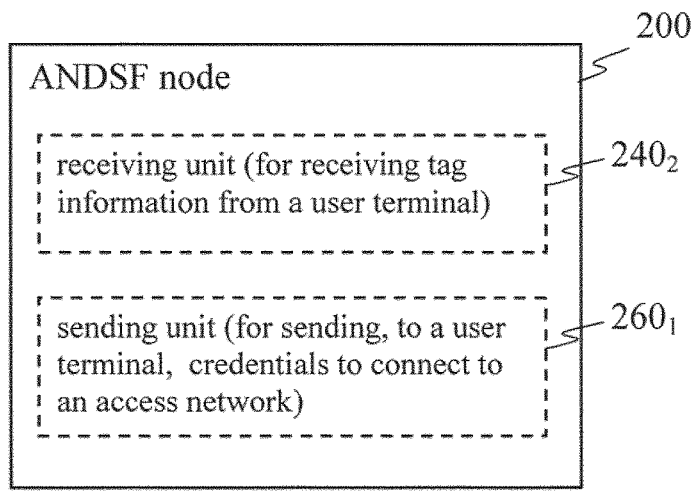
FIG. 11 schematically illustrates an ANDSF node in one embodiment of the invention.

FIG. 11 schematically illustrates, as one embodiment of the invention, a network node hosting an ANDSF, i.e. an ANDSF node 200. The ANDSF node 200 illustrated on FIG. 11 may also be implemented as for example illustrated in FIG. 8.

ANDSF node 200 comprises a so-called receiving unit 240$_2$ and a so-called sending unit 260$_1$. Receiving unit 240$_2$ is configured to receive, from a user terminal 100, tag information 50 obtained by user terminal 100 from at least one of an electronic tag and a visual tag. Sending unit 260$_1$ is configured to send, to user terminal 100, credentials for allowing user terminal 100 to connect to the access network.

In one embodiment (not illustrated in FIG. 11), receiving unit 240$_2$ is configured to receive tag information 50 from user terminal 100 in an ANDSF MO, such as for example as an information element of the UE_Location node subtree of the ANDSF MO.

In one embodiment (not illustrated in FIG. 11), tag information 50 comprises an application MIME type that ANDSF node is capable of recognizing.

In one embodiment (not illustrated in FIG. 11), sending unit 260$_1$ is configured to send credentials to user terminal 100 in an ANDSF MO.

In one embodiment (not illustrated in FIG. 11), sending unit 260$_1$ is further configured to send, to user terminal 100, information indicating a period of validity of the credentials.

In one embodiment (not illustrated in FIG. 11), sending unit 260$_1$ is further configured to send, to user terminal 100, policy information indicating that connecting to the access network for which the credentials are transmitted is preferred over other access networks. The policy information may also indicate a period of validity of the policy information.

The invention also relates to the following embodiments numbered (i) to (xxvii):

(i) A method carried out in a telecommunication network for assisting a user terminal 100 in connecting to an access network, described in the above section "Summary", or defined in claim 1, wherein the visual tag comprises a barcode comprising at least one of a linear barcode and a two-dimensional barcode.

(ii) A method carried out in a telecommunication network for assisting a user terminal 100 in connecting to an access network, described in the above section "Summary", or defined in claim 1, wherein the tag information 50 transmitted s40 from the user terminal 100 to the ANDSF node 200 is carried in an ANDSF Management Object (MO).

(iii) A method according to embodiment (ii), wherein the tag information 50 is carried as an information element of the UE_Location node subtree of the ANDSF Management Object.

(iv) A method carried out in a telecommunication network for assisting a user terminal 100 in connecting to an access network, described in the above section "Summary", or defined in claim 1, wherein the credentials 70 transmitted from the ANDSF node 200 to the user terminal 100 are carried in an ANDSF Management Object.

(v) A method carried out in a telecommunication network for assisting a user terminal 100 in connecting to an access network, described in the above section "Summary", or defined in claim 1, further comprising:

transmitting, from the ANDSF node 200 to the user terminal 100, policy information indicating that connecting to the access network for which the credentials 70 are transmitted is preferred over other access networks, wherein the policy information indicates a period of validity of the policy information.

(vi) A method carried out in a telecommunication network for assisting a user terminal 100 in connecting to an access network, described in the above section "Summary", or defined in claim 1, wherein the at least one of an electronic tag and a visual tag is located within, or in the vicinity of, the area covered by the access network for which the credentials 70 are transmitted.

(vii) A method carried out in a telecommunication network for assisting a user terminal 100 in connecting to an access network, described in the above section "Summary", or defined in claim 1, wherein the access network is any one of (a) a wireless local area network interoperable with IEEE 802.11 standards; (b) a wireless metropolitan area network interoperable with IEEE 802.16 standards; (c) a personal area network interoperable with Bluetooth standards; (d) a personal area network interoperable with ZigBee standards; and (e) a local area network interoperable with IEEE 802.3 standards.

(viii) A method carried out in a telecommunication network for assisting a user terminal 100 in connecting to an access network, described in the above section "Summary", or defined in claim 1, wherein the step of transmitting s40, from the user terminal 100 to the ANDSF node 200, the tag information 50, and the step of transmitting s60, from the ANDSF node 200 to the user terminal 100, credentials 70 for allowing the user terminal 100 to connect to an access network, are both carried out over at least a cellular radio access network.

(ix) A method carried out by a user terminal 100 for connecting to an access network, described in the above section "Summary", or defined in claim 8, wherein the barcode comprises at least one of a linear barcode and a two-dimensional barcode.

(x) A method carried out by a user terminal 100 for connecting to an access network, described in the above section "Summary", or defined in claim 8, wherein the tag information 50 sent to the ANDSF node 200 is carried in an ANDSF Management Object.

(xi) A method according to embodiment (x), wherein the tag information 50 is carried as an information element of the UE_Location node subtree of the ANDSF Management Object.

(xii) A method carried out by a user terminal 100 for connecting to an access network, described in the above section "Summary", or defined in claim 8, wherein the credentials 70 received from the ANDSF node 200 are carried in an ANDSF Management Object.

(xiii) A method carried out by a user terminal 100 for connecting to an access network, described in the above section "Summary", or defined in claim 8, further comprising:
receiving, from the ANDSF node 200, policy information indicating that connecting to the access network for which the credentials 70 are received is preferred over other access networks,
wherein the policy information indicates a period of validity of the policy information.

(xiv) A method carried out by an ANDSF node 200, described in the above section "Summary", or defined in claim 17, wherein the visual tag comprises a barcode comprising at least one of a linear barcode and a two-dimensional barcode.

(xv) A method carried out by an ANDSF node 200, described in the above section "Summary", as defined in claim 17, wherein the tag information 50 received from the user terminal 100 is carried in an ANDSF Management Object.

(xvi) A method according to embodiment (xv), wherein the tag information 50 is carried as an information element of the UE_Location node subtree of the ANDSF Management Object.

(xvii) A method carried out by an ANDSF node 200, described in the above section "Summary", or defined in claim 17, wherein the credentials 70 sent to the user terminal 100 are carried in an ANDSF Management Object.

(xviii) A method carried out by an ANDSF node 200, described in the above section "Summary", or defined in claim 17, further comprising:
sending, to the user terminal 100, policy information indicating that connecting to the access network for which the credentials 70 are transmitted is preferred over other access networks,
wherein the policy information indicates a period of validity of the policy information.

(xix) User terminal 100 described in the above section "Summary", or defined in claim 24, wherein the visual tag comprises a barcode comprising at least one of a linear barcode and a two-dimensional barcode.

(xx) User terminal 100 described in the above section "Summary", or defined in claim 24, wherein the sending unit 140$_1$ is configured to send the tag information 50 to the ANDSF node 200 in an ANDSF Management Object.

(xxi) User terminal 100 according to embodiment (xx), wherein the sending unit 140$_1$ is configured to send the tag information 50 as an information element of the UE_Location node subtree of the ANDSF Management Object.

(xxii) User terminal 100 described in the above section "Summary", or defined in claim 24, wherein the receiving unit 160$_2$ is configured to receive the credentials 70 from the ANDSF node 200 in an ANDSF Management Object.

(xxiii) User terminal 100 described in the above section "Summary", or defined in claim 24, wherein
the receiving unit 160$_2$ is further configured to receive, from the ANDSF node 200, policy information indicating that connecting to the access network for which the credentials 70 are received is preferred over other access networks, and
wherein the policy information indicates a period of validity of the policy information.

(xxiv) ANDSF node 200 described in the above section "Summary", or defined in claim 32, wherein the receiving unit 240$_2$ is configured to receive the tag information 50 from the user terminal 100 in an ANDSF Management Object.

(xxv) ANDSF node 200 according to embodiment (xxiv), wherein the receiving unit 240$_2$ is configured to receive the tag information 50 as an information element of the UE_Location node subtree of the ANDSF Management Object.

(xxvi) ANDSF node 200 described in the above section "Summary", or defined in claim 32, wherein the sending unit 260$_1$ is configured to send credentials to the user terminal 100 in an ANDSF Management Object.

(xxvii) ANDSF node 200 described in the above section "Summary", or defined in claim 32,
wherein the sending unit 260$_1$ is further configured to send, to the user terminal 100, policy information indicating that connecting to the access network for which the credentials are transmitted is preferred over other access networks, and
wherein the policy information indicates a period of validity of the policy information.

Where the terms "obtaining unit", "sending unit", "receiving unit", "connecting unit", etc. are used herewith, no restriction is made regarding how distributed these elements may be and regarding how gathered elements may be. That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned obtaining unit, sending unit, receiving unit, connecting unit, etc. is replaced by obtaining unit, sending unit, receiving unit, connecting unit, etc. respectively, for performing the functions of the obtaining unit, sending unit, receiving unit, connecting unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

3GPP 3rd Generation Partnership Project
AAA Authentication, authorization and accounting
AES Advanced Encryption Standard
ANDSF Access Network Discovery and Selection Function
AP Access point
BS-ID Base Station Identity
BSSID Basic Service Set Identifier
E-UTRAN Evolved UMTS Terrestrial Radio Access
EAP Extensible Authentication Protocol
EDGE Enhanced Data rates for GSM Evolution
GERAN GSM EDGE radio access network
GSM Global System for Mobile Communications
HESSID Homogeneous Extended Service Set Identifier
HRPD High Rate Packet Data
Hypertext Transfer Protocol
IMEI International Mobile Station Equipment Identity
IMSI International mobile subscriber identity
IP Internet Protocol
ISMP Inter-system mobility policy
ISRP Inter-system routing policy
LAC Location Area Code
LAN Local area network
MAN Metropolitan area network
MIME Multipurpose Internet Mail Extensions
MO Management object
NAP-ID Network Access Provider Identity
NFC Near-field communication
NID Network Identifier
PLMN Public land mobile network
PSK Pre-Shared Key
QR code Quick Response Code
RFID Radio-frequency identification
RPLMN Registered PLMN
SID System Identifier
SSID Service set identifier
TAC Tracking Area Code
TTLS Tunneled Transport Layer Security
UE User equipment
UMTS Universal Mobile Telecommunications System
UTRAN Universal Terrestrial Radio Access Network
WMAN Wireless MAN
WEP Wired Equivalent Privacy
WIMAX Worldwide Interoperability for Microwave Access
WLAN Wireless LAN
WPA2 Wi-Fi Protected Access 2
XML Extensible Markup Language

The invention claimed is:

1. A method carried out in a telecommunication network for assisting a user terminal in connecting to an access network provided by a third party, the method comprising:
storing, by the telecommunications network node, information associated with credentials for accessing the access network provided by the third party;
obtaining, by the user terminal, tag information from at least one of an electronic tag and a visual tag associated with the access network provided by the third party, wherein the tag information includes an application type that identifies an access network discovery and selection function;
based on the application type, transmitting, from the user terminal to a network node hosting an access network discovery and selection function the tag information;
based on the tag information received from the user terminal, performing, by the network node, the access network discovery and selection function for the access network by identifying the credentials for allowing the user terminal to connect to the access network provided by the third party; and
transmitting, from the network node to the user terminal, the credentials for allowing the user terminal to connect to said access network provided by the third party.

2. The method of claim 1, wherein the electronic tag comprises at least one of a near field communication tag and a radio-frequency identification tag.

3. The method of claim 1, wherein the visual tag comprises a barcode.

4. The method according to claim 1, wherein the tag information comprises an application Multipurpose Internet Mail Extensions type.

5. The method according to claim 1, further comprising:
transmitting, from the network node to the user terminal, information indicating a period of validity of the credentials.

6. The method according to claim 1, further comprising:
transmitting, by the network node to the user terminal, policy information indicating that connecting to the access network for which the credentials are transmitted is preferred over other access networks.

7. The method according to claim 1, further comprising:
connecting, by the user terminal, to the access network using the transmitted credentials.

8. A method carried out by a user terminal for connecting to an access network provided by a third party, the method comprising:
obtaining tag information from at least one of an electronic tag and a visual tag associated with the access network provided by the third party, wherein the tag information includes an application type that identifies an access network discovery and selection function;

based on the application type, transmitting, to a telecommunications network node hosting an access network discovery and selection function for the access network provided by third party, the tag information; and receiving, from the telecommunications network node, credentials for allowing the user terminal to connect to said access network provided by the third party.

9. The method of claim 8, wherein the electronic tag comprises at least one of a near field communication tag and a radio-frequency identification tag.

10. The method of claim 8, wherein the visual tag comprises a barcode.

11. The method according to claim 8, wherein the tag information comprises an application Multipurpose Internet Mail Extensions type.

12. The method according to claim 8, further comprising:
receiving, from the telecommunications network node, information indicating a period of validity of the credentials.

13. The method according to claim 8, further comprising:
receiving, from the telecommunications network node, policy information indicating that connecting to the access network for which the credentials are received is preferred over other access networks.

14. The method according to claim 8, further comprising:
connecting to the access network using the transmitted credentials.

15. The method according to claim 8, wherein the at least one of an electronic tag and a visual tag is located within, or in the vicinity of, the area covered by the access network for which the credentials are received.

16. The method according to claim 8, wherein the access network is any one of
- a wireless local area network interoperable with IEEE 802.11 standards;
- a wireless metropolitan area network interoperable with IEEE 802.16 standards;
- a personal area network interoperable with Bluetooth standards;
- a personal area network interoperable with ZigBee standards; and
- a local area network interoperable with IEEE 802.3 standards.

17. A non-transitory computer-readable medium storing a computer program comprising computer executable instructions configured, when executed by a processor, to cause a user terminal to execute a method according to claim 8.

18. A user terminal comprising:
a memory storing instructions; and
a processor configured to execute the instructions to cause the user terminal to:
obtain tag information from at least one of an electronic tag and a visual tag associated with the access network provided by the third party, wherein the tag information includes an application type that identifies an access network discovery and selection function;
based on the application type, transmit, to a telecommunications network node hosting an access network discovery and selection function for the access network provided by the third party, the tag information; and
receive, from the telecommunications network node, credentials for allowing the user terminal to connect to said access network provided by the third party.

19. The user terminal of claim 18, wherein the electronic tag comprises at least one of a near field communication tag and a radio-frequency identification tag.

20. The user terminal of claim 18, wherein the visual tag comprises a barcode.

21. The user terminal according to claim 18, wherein the processor is configured to send the tag information to the telecommunications network node with an application Multipurpose Internet Mail Extensions type.

22. The user terminal according to claim 18, wherein the processor is further configured to receive, from the telecommunications network node, information indicating a period of validity of the credentials.

23. The user terminal according to claim 18, wherein the processor is further configured to receive, from the telecommunications network node, policy information indicating that connecting to the access network for which the credentials are received is preferred over other access networks.

24. The user terminal according to claim 18, wherein the processor is configured to connect to the access network using the transmitted credentials.

25. The user terminal according to claim 18, wherein the access network is any one of
- a wireless local area network interoperable with IEEE 802.11 standards;
- a wireless metropolitan area network interoperable with IEEE 802.16 standards;
- a personal area network interoperable with Bluetooth standards;
- a personal area network interoperable with ZigBee standards; and
- a local area network interoperable with IEEE 802.3 standards.

* * * * *